F. B. Morse.
Carriage Top.
Nº 96.254.   Patented Oct. 26, 1869.
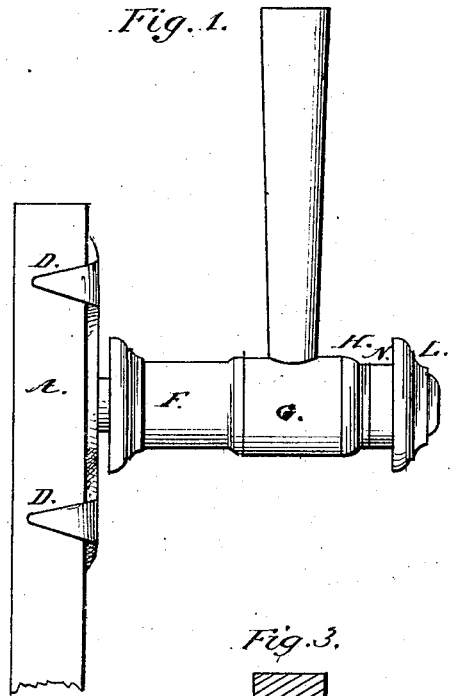
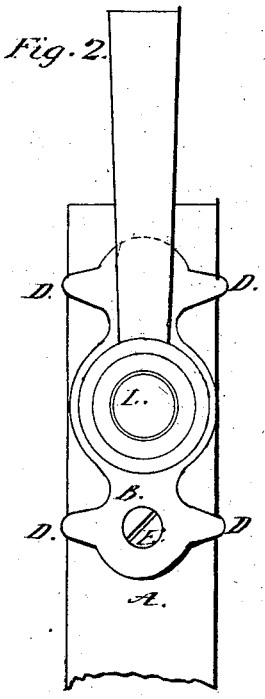
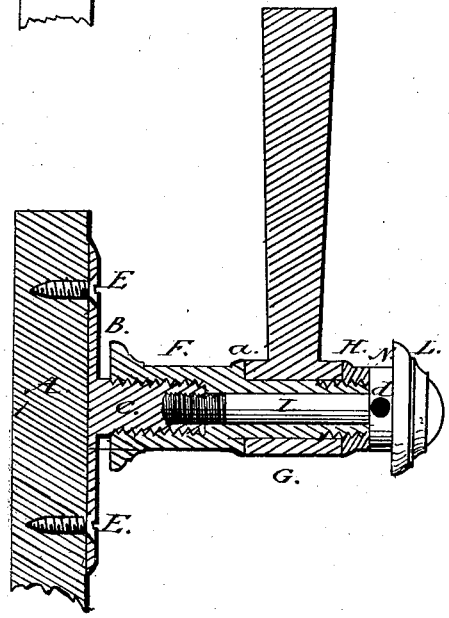
Witnesses
John H. Shumway
A. J. Tibbits
F. B. Morse
Inventor:
By his Attorney,
John E. Earle

United States Patent Office.

F. B. MORSE, OF PLANTSVILLE, CONNECTICUT, ASSIGNOR TO HIMSELF AND H. D. SMITH & CO., OF SAME PLACE.

*Letters Patent No. 96,254, dated October 26, 1869.*

IMPROVED TOP-PROP FOR CARRIAGES.

The Schedule referred to in these Letters Patent and making part of the same

*To all whom it may concern:*

Be it known that I, F. B. MORSE, of Plantsville, in the county of Hartford, and State of Connecticut, have invented a new Improvement in Top-Prop for Carriages; and I do hereby declare the following, when taken in connection with the accompanying drawings, and the letters of reference marked thereon, to be a full, clear, and exact description of the same, and which said drawings constitute part of this specification, and represent, in—

Figure 1, a side view;
Figure 2, an end view, and in
Figure 3, a longitudinal central section.

This invention relates to an improvement in the article of manufacture known to the trade as top-props for carriages, the object being to form a larger bearing on the prop, and prevent the accidental displacement of the head of the prop; and The invention consists in forming the bow-plate so as to be clamped on to the bow, both above and below the prop, and with a stud formed on the plate, threaded to receive a sleeve, upon which said sleeve a bearing for the joint of the bow is formed, and on to the sleeve, outside the bow-joint, a nut is applied, the thread of the nut corresponding to the thread by which the sleeve is attached to the plate; then through the sleeve a bolt is passed, screwing into the stud on the plate, the head of the said bolt jamming on to the nut on the end of the sleeve.

To enable others skilled in the art to make and use my invention, I will proceed to describe the same, as illustrated in the accompanying drawings.

A represents one of the bows of the carriage-top.

B, the prop-plate, on which is formed a stud, C, as seen in fig. 3.

The said prop-plate extends each way from the stud, and is formed with points D D, near each end, as seen in figs. 1 and 2, which are bent around the bow, so as to clasp and prevent the turning of the plate on the bow; and an additional security is given by setting two screws, E, through the plate into the bow.

The stud C is threaded, say, for instance, with a fourteen thread.

F is a sleeve, formed so as to screw on to the stud, as seen in fig. 3, the said sleeve being of sufficient length to form a shoulder, a, and bearing for the joint G of the brace, and so that said joint will turn freely on the said bearing.

The end of the sleeve is threaded to receive a nut, H, the thread corresponding to the thread on the stud C, so that if the nut be pushed too tight against the joint G, the sleeve itself might turn, and prevent the breaking of the prop.

Through the sleeve a bolt, I, is passed, screwing into the end of the stud C, with a thread finer than that on the stud and nut, and so that the head L, of the said bolt, will bear against the nut H, and serve as a jam-nut, as well as a support for the prop.

By this construction, it will be observed that by no possibility can the head be accidentally lost; and further, it will be observed that by this construction a more ornamental head, and one conforming more perfectly to the symmetry of the whole, than by the common construction, as, by the introduction of the bolt I in the manner described, the neck N of the bolt may be made round, corresponding to the nut H, which is also round, (the said nut H being simply turned on with the thumb and finger,) and when the bolt is turned down on to the nut, both the bolt and nut are "jammed," so that no amount of jar can displace the one or other.

If desirable, the neck of the bolt may be bored into, as at *d*, fig. 3, and a pin inserted, by which to turn the head down.

It will further be observed, that in the use of my prop, the bow is in no way weakened, as the plate is attached upon the outside of the bow, and its manner of attachment serves to strengthen the bow at that point; and further, the plate being attached, the covering is put on over the stud, and the sleeve F "jammed" down thereon, to hold the covering on to the plate.

Having fully described my invention,

What I claim as new and useful, and desire to secure by Letters Patent, is—

1. The combination of the threaded stud C, with the sleeve F, on which said sleeve a bearing is formed for the joint G, and its outer end fitted to receive the nut H, substantially as set forth.

2. In combination with the subject-matter of the first clause of claims, the bolt I, constructed and applied substantially as set forth.

F. B. MORSE.

Witnesses:
JOHN H. SHUMWAY,
A. J. TIBBITS.